United States Patent Office 3,810,972
Patented May 14, 1974

3,810,972
REDUCTION OF SULPHUR OXIDES
Robert Walter Humphrey, Didcot, and Gerald Moss, Oxford, England, assignors to Esso Research and Engineering Company
Filed Feb. 24, 1972, Ser. No. 228,829
Int. Cl. C01b *17/04;* C10g *9/28*
U.S. Cl. 423—569                                    14 Claims

ABSTRACT OF THE DISCLOSURE

A substrate is coked by contact with oil at cracking temperature, and the coked substrate is then contacted with sulphur oxides-containing gases to reduce the sulphur oxides to sulphur (which is recovered) and to oxidize coke to carbon oxides. The cracked oil vapors are also recovered. The process is operated either cyclically, intermittently or continuously.

---

Figure 1:
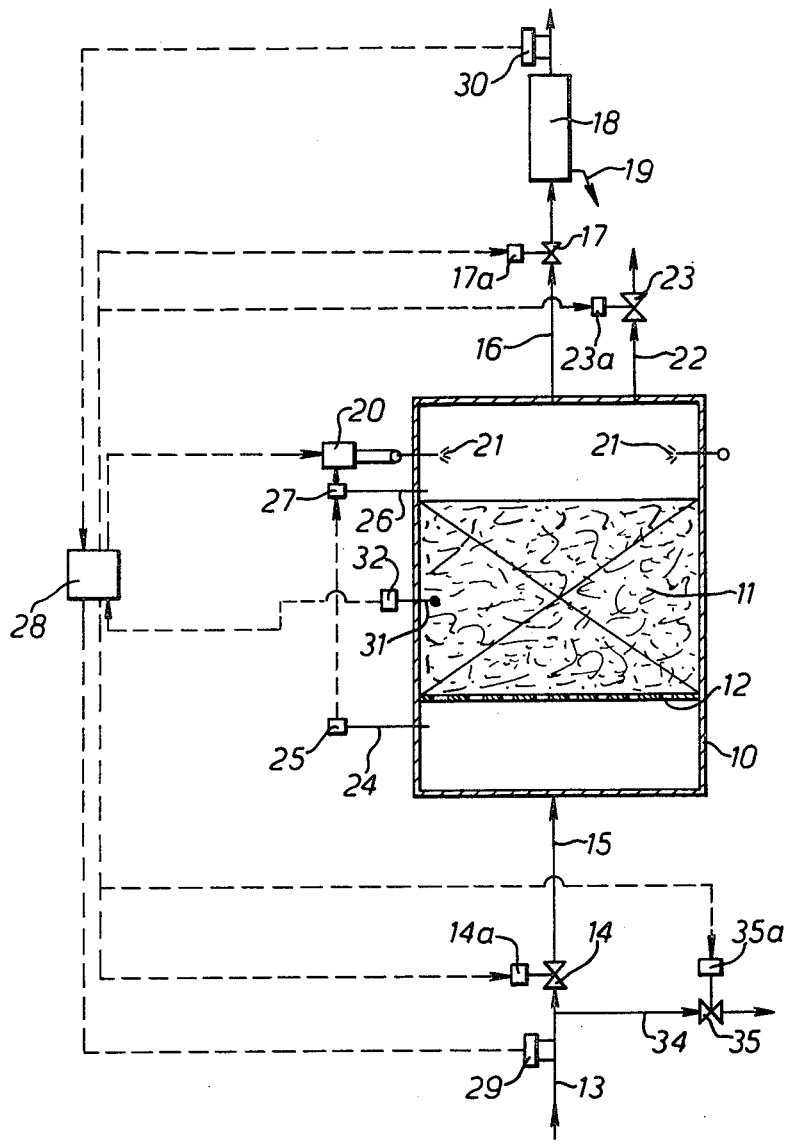

The present invention relates to the reduction of $SO_2$. Processes have been proposed for reducing $SO_2$ to $H_2S$ or elemental sulphur employing normally gaseous hydrocarbons as the reducing agent, and in the presence of a catalyst such as vanadium pentoxide.

It has now been discovered, in accordance with this invention, that $SO_2$ can be reduced by contact with a solid or semisolid carbonaceous material at elevated temperatures, optionally in the presence of a solid substrate which may exert a catalytic effect on, or otherwise promote, the reaction.

The carbonaceous material may be derived from petroleum, coal or synthetic resins, the latter being preferably waste resins. Specific materials are coal- or petroleum-derived pitches, tars and asphalts, petroleum-derived fuel oil, residues and cracked cycle oils.

If it is desired to reduce the $SO_2$ to elemental sulphur, it is preferred to employ a carbonaceous material having a relatively low hydrogen content: similarly, if it is desired to reduce the $SO_2$ to $H_2S$, the hydrogen content is of less importance and the C/H molar ratio may be lower.

In one type of embodiment of the process of the invention, $SO_2$ or gases containing $SO_2$ are passed in contact with carbonaceous material which has been laid down on a substrate during thermal cracking of a hydrocarbon feedstock. Suitable substrates are in particulate form and may be alumina, bauxite, alumina-silica mixtures, zeolites, alumina and chromia (up to 10% wt. chromia) or mixtures of any of the foregoing: a preferred substrate is bauxite. Thus, a substrate (such as bauxite) may be maintained at a temperature such that a fuel oil sprayed thereonto is thermally cracked and a coke-like material laid down on the bauxite. A suitable range of temperature in the case of fuel oil is 310–700° C., preferably 420–620° C., and the coke-like deposit formed has a relatively low hydrogen content. The amount of coke laid down on the substrate, e.g. bauxite, is preferably not so great that the bauxite is completely plugged throughout its pores with coke. When $SO_2$ is passed over the coked bauxite, an exothermic reaction takes place and the $SO_2$ is reduced to elemental sulphur and the carbon of the coke is oxidized to oxides of carbon. The $SO_2$ reduction step may be performed at temperatures in the range of about 350–1200° C. when the substrate has a catalytic or promotional effect on the reaction, and a preferred temperature range in this case is between 540 and 600° C. On the other hand, when the substrate exerts no substantial catalytic or promotional effect, higher temperatures may be desirable, e.g. 1000–1200° C. or higher. Above about 1200° C., the reaction appears to take the form of a direct flame reaction. It will be appreciated that since the reduction step is exothermic, it may be employed to provide or contribute to the heat for the thermal coking step. Thus in one form of this type of embodiment (which uses a catalytically active substrate), bauxite at a temperature of 560° C. is sprayed with fuel oil whereby the fuel oil is endothermically cracked to vapor-phase hydrocarbons and hydrogen, and a coke deposit is formed on the bauxite. If necessary, at least some of the vapor phase product may be burned to provide heat to maintain the required temperature of the substrate during the hydrocarbon cracking. A gas stream containing $SO_2$ is passed over the coked bauxite and during the resulting reaction, coke is removed in an exothermic reaction as carbon oxides while the sulphur dioxide is reduced predominantly to sulphur. The proportion of $SO_2$ that is reduced to sulphur depends on a number of factors, the more important of which are the C/H ratio of the coke (which will affect the proportion of $H_2S$ formed), the amount of coke on the bauxite and the amount of oxidizing substances, apart from $SO_2$, present in the $SO_2$-containing gases. Thus, if the $SO_2$-containing gases comprise free $O_2$ or even $CO_2$, much of the coke deposit will be re-removed by reaction with these and it will be appreciated that for optimum reduction of $SO_2$ to sulphur, the $SO_2$ containing gases should contain a maximum proportion of $SO_2$ and as little as possible of $O_2$ and $CO_2$. Methods of concentrating $SO_2$ from dilute $SO_2$ or other dilute sulphur-containing gas streams are disclosed in British patent specification 1,183,937 and our co-pending U.S. patent application S.N. 94,476, filed in December 1970.

The process as hereinbefore described may be operated as a cyclic process or a continuous process. In the cyclic mode of operation, hot bauxite may be sprayed with the hydrocarbon oil until an adequate supply of coke deposit is formed thereon: the coked bauxite is then contacted with the $SO_2$ gas stream, the period of contact being varied in accordance with the proportion of unconverted $SO_2$ or of carbon oxides in the gases which have passed over the bauxite. Sulphur is condensed out of the off-gases, and if the $SO_2$ content of the off-gases is high or the $CO_2$ content is too low, the flow of gases into contact with the bauxite is interrupted until a coke deposit has been formed thereon by thermal cracking, as hereinbefore described, or the $SO_2$-containing gases may be diverted into contact with another mass of coked bauxite until the reducing activity of the latter has so diminished that the gases can be re-directed back into contact with the now coked bauxite used in the first part of the cycle. Alternatively, or additionally, to monitor the composition of the gases leaving the $SO_2$ reduction zone, the temperature of the zone may be monitored. A falling temperature in the reduction zone is indicative of less conversion of $SO_2$, due either to a reduction in the $SO_2$ throughput (which can be checked by monitoring the $SO_2$ content of the gases passing to the reduction zone) or to insufficient coke material in the reduction zone.

The process may be operated continuously with a single mass of bauxite which may be in a fixed bed or fluidized by the $SO_2$ containing gases. In one type of continuous operation, the $SO_2$ content of the off-gases (relative to the feedgases) is monitored, and when the content is so high as to be indicative of a poor conversion efficiency, a suitable source of carbon, such as fuel oil or catalytic cycle oil is sprayed onto and/or into the bauxite without interrupting the flow of gases; valve means responsive to the $SO_2$ content of the off-gases may automatically recycle the off-gases when the $SO_2$ content is too high either to another bed of coke bauxite or to a suitable $SO_2$ absorbent such as that disclosed in U.K. patent specification 1,183,937 or in U.S. patent application S.N. 94,476. If the SO₂ content of the off-gases rises, the cause may be:

(1) an absence or limited quantity of coke deposit on the bauxite for the reduction of the $SO_2$, or
(2) an excess of deposit such that the bauxite is plugged with coke and there is substantially no contact between the $SO_2$ and the bauxite.

In order to distinguish between conditions (1) and (2) when the $SO_2$ concentration in the off-gases rises, it is desirable to monitor the amount of solid material in the bauxite bed. The amount of solid material may be determined by "weighing" the bed, conveniently by measuring the pressure drop of gas passing through the bed. Thus, when the $SO_2$ content of the off-gases rises, a signal representative of the weight of material in the bed (e.g., a pressure drop signal) influences the supply of the fuel oil or catalytic cycle oil to the bed: a high pressure drop signal closes off the oil supply, while a low pressure drop signal causes oil to be injected or sprayed into the bed as described above.

A small make-up of fresh bauxite to the bed and a small bleed therefrom ensures that the activity of the bauxite is maintained.

In another method of continuous operation, particles of bauxite are circulated continuously between an $SO_2$-reducing reaction and a thermal cracking reactor, the circulatory system being similar to that employed in continuous catalytic cracking of hydrocarbons. Fuel oil or cycle oil are continuously injected or sprayed into the bauxite in the cracking reactor whereby a deposit of coke is formed on the particles, the cracked vapor phase hydrocarbons being recovered for other uses as supplying heat for maintaining the cracking temperature. $SO_2$-containing gases are passed continuously through the $SO_2$-reducing reactor, and the gases may fluidize the particles therein. $SO_2$ is reduced to sulphur which is condensed out of the off-gases, and some or all of the coke on the bauxite particles is oxidized to carbon oxides which pass out of the reducing reactor with the off-gases. According to the $SO_2$ content of the reducing reactor off-gases, the amount of oil injected into the cracking reactor is varied. The regulation of the injection of the oil in this and other types of embodiment may additionally or alternatively be dependent on the temperature of the bauxite over or through which the $SO_2$-gases are passing: thus, when the temperature of the bauxite tends to fall, indicating that there is a reduction in the rate of oxidation of coke to carbon oxides, fuel oil may be sprayed onto the bauxite to form further quantities of coke. Preferably, the flow of bauxite in the cracking reactor is cocurrent with the flow of hydrocarbon, and preferably cocurrent with the $SO_2$ gas stream in the reducing reactor.

Although the invention has been described above with bauxite as the substrate upon which the coke is formed, other substrates may be used such as conventional cracking catalysts (e.g. silica-alumina) or crystalline or amorphous zeolite alumino-silicates. In appropriate circumstances, the cracking catalyst may comprise a hydrogenation component and the cracking may be performed in the presence of hydrogen so that the vapor-phase hydrocarbon cracked product may be of saturated hydrocarbons: this type of operation is preferably employed when the cracking of the hydrocarbon is effected separately from the reduction of $SO_2$ so that formation of $H_2S$ is minimized.

Figure 2:
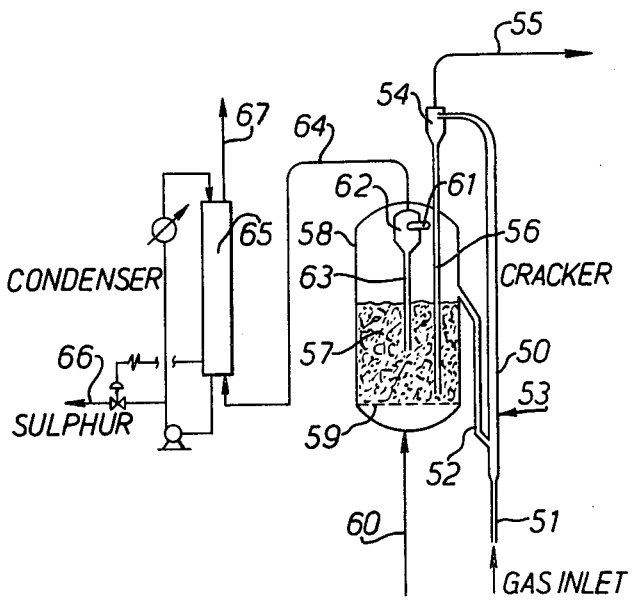

Some nonlimitative embodiments exemplifying the invention are now described with reference to the accompanying diagrammatic drawings in which:

FIG. 1 is a schematic diagram of a cracker/reducer system for cyclic operation, and FIG. 2 is a schematic diagram of a continuous operation cracker/reducer system.

In FIG. 1, the pyrolysis of hydrocarbon oil, such as fuel oil, and the reduction of $SO_2$ are preformed in the single insulated vessel 10 containing a bed 11 of bauxite or silica-alumina supported on a perforated gas distributor 12. $SO_2$-containing gas is supplied via line 13, control valve 14 and line 15 to the interior of the vessel 10 for distribution into and through the bed 11 by the distributor 12. The reduced $SO_2$-containing gas and products leaves the vessel 10 via line 16, valve 17, sulphur condenser 18, and is then either released to atmosphere or recycled to an $SO_2$ concentrating plant (of the type described in e.g., U.K. patent specification 1,183,937) depending on the $SO_2$ content thereof. Condensed sulphur is recovered from the condenser 18 preferably in liquid from via line 19. The dimensions of the vessel 10 and bed 12 are so chosen that for the design operational conditions, the bed 11 will be fluidized by the passage therethrough of the $SO_2$-containing gas.

Fuel oil or catalytic cycle oil is supplied from a pump 20 to one or more oil injectors 21 (some of which may be in bed 11) so arranged as to provide substantially uniform distribution of oil to the bed 11. Vaporous products from cracking the oil leave the vessel via line 22 and control valve 23 and at least some may be used, if necessary, to maintain the temperature of the bed 11 by combustion in suitable burners (not shown). The burners could be located beneath the distributor 12.

The amount of carbon lay-down in the bed 11 is determined by the difference in pressure between a lower pressure probe 24 which produces a pressure signal by means of its associated transducer 25 and an upper pressure probe 26 which produces a pressure signal by means of its transducer 27.

The overall control of the system is effected by a controller 28, which receives signals from an $SO_2$ monitor 29 in line 13, an $SO_2$ monitor 30 in line 16, and optionally, a bed temperature signal from temperature monitor 31 and its transducer 32. According to the signals received by the controller 28, appropriate controlling signals are transmitted to actuators 14a, 17a and 23a of respective valves 14, 17 and 23, and also to the pump 20 to start the latter. A differential pressure signal, P, is generated at pressure transducer 27 and at a predetermined high pressure, the signal P stops the pump 20.

As so far described, and assuming that the bed 11 contains coked bauxite at a temperature of about 550° C., valves 14 and 17 are open while valve 23 is closed. $SO_2$-containing gas passes into the bed 11, being monitored for its $SO_2$ content by monitor 29. In the bed 11, the $SO_2$ is reduced by the carbon deposit to products including elemental sulphur, and the carbon is oxidized mainly to $CO_2$. The gases and vapors leave the bed 11 and vessel 10 via line 16, through the sulphur condenser 18 where the hot gases are cooled and any sulphur therein is condensed and is recovered at line 19, and thence through $SO_2$ monitor 30. As long as the $SO_2$ content as determined by monitor 30 is low (e.g., less than 0.05%) while the $SO_2$ content at monitor 30 is high (e.g., at least 5% and preferably no less than 9%), the controller 28 is programmed to be inactive. However, if the $SO_2$ content at montor 30 rises, indicating a fall in reactivity in the bed 11, the controller 28 transmits signals to actuators 14a and 17a to close the valves 14 and 17, and to actuator 23a to open valve 23, and then transmits a signal to start the pump 20. If the differential pressure P across the bed 11 as indicated by transducer 27 is not excessive and the bed 11 is therefore not plugged with coke, the pump 20 will deliver oil to the injectors. The delivery of oil will continue until the bed differential pressure reaches the desired maximum, whereat the transducer 27 transmits a signal to stop the pump 20. The injected oil is cracked to coke which deposits in the bed, and hydrogen and vapor phase products which escape from vessel 11 via line 22 and valve 23.

When the pump 20 has stopped, an initiating signal is transmitted to the controller 28. The initiating signal may be the same signal as the pump-stopping signal of the transducer 27, or it may be a temperature signal from the temperature transducer 32, if the latter is employed. The temperature transducer 32 may also initiate any necessary reheating of the bed 11 if its temperature has fallen excessively, the heating being achieved using some of the calorific value of the combustible gases and vapours which have left via line 22.

The aforesaid initiating signal resets the controller 28 so that it transmits signals to actuator 23a to close valve 23 and then transmits signals to actuators 14a and 17a to open valves 14 and 17, thereby permitting the further passage of $SO_2$.

The system of FIG. 1 may be adapted to include a second vessel with valves and oil injectors etc. as illustrated, so that while oil is being injected into one vessel, the $SO_2$-stream can be diverted to a second vessel for reduction. In this modification, there is provided a diversion line 34 upstream of valve 14, there being a valve 35 controlled by an actuator 35a in the diversion line. Line 34 leads to the second vessel, and the modified system is so arranged that signals from the controller 28 which close valve 14 also cause actuator 35a to open valve 35. Similarly, when valve 35 is closed, valve 14 is opened.

Referring now to FIG. 2, bauxite or other particles are fluidized in an oil cracker transfer line 50 by means of a substantially sulphur-free substantially inert gas, which may be a flue gas, at a temperature suitable to maintain the particles at an oil cracking temperature, e.g., 450° C. The inert gas is blown into the base 51 of the tarnsfer line 50, and hot bauxite particles which have been partially or fully decoked, pass downwardly via line 52 into the lower part of the transfer line 50. The inert gas upwardly fluidizes the hot particles, and slightly above the junction of lines 51 and 52, oil is injected into line 50 via injectors 53. The oil and particles pass concurrently upwards in line 50, coke being deposited on the particles and vapor-phase products being thereby produced. At the top of line 50 is a cyclone (or series of cyclones) 54 in which the vaporous products are separated from the coked solids, the former being recovered via line 55, and if necessary, some being burned to provide heat for temperature control of the illustrated system, while the latter pass into a downcomer pipe 56 to the bottom region of a fluidized bed 57 of particles which are upwardly fluidized by a stream of $SO_2$ containing gases. The bed 57 is contained in an insulated vessel 58 and supported on a distributor 59 for the $SO_2$ containing gas. The $SO_2$ gas is supplied to the base of the vessel 58 from line 60.

The coked particles and $SO_2$ gases move generally concurrently upwards in the bed 57, and $SO_2$ is reduced by oxidization of the coke on the particles. Partially or fully decoked particles "splash" from the top of the bed 57 into the top end of the pipe 52 for recirculation, while reduced $SO_2$ products and entrained solids pass upwards into the entrance 61 of a cyclone 62 whereat the solids are separated from the gases and vapors and pass down the downcomer 63 to the bed 57.

The gases and vapors pass out of the cyclone 62 via line 64 to a sulphur condenser and by suitably controlling the temperature therein, sulphur is recovered as liquid sulphur at line 66. The noncondensible gases escape from the condenser 65 via line 65.

The present invention provides an economical solution to the problems provided by an increasing number of processes for removing sulphur from the fuels or flue gases, and which processes furnish $SO_2$ in concentrations usually exceeding 5% and sometimes as high as 15%. One such process is that disclosed in British patent specification 1,183,937 and another is disclosed in U.S. application Ser. No. 94,476, both of which processes are hereby incorporated in this disclosure.

Among the solutions previously proposed for the disposition of concentrated streams of $SO_2$ are the conversion to sulphuric acid, which has limited uses and tends to be a glut, or to various sulphates which themselves present disposal problems.

By converting the $SO_2$ to S, the most versatile transportable and storage sulphur product is obtained, and the conversion of the present invention is cheap to perform.

We claim:

1. A method of converting sulphur dioxide to sulphur and other reduction products of sulphur dioxide in a reactor system, the method comprising the steps of
   (a) providing solid particulate material in the system, and contacting at least some of the material with a hydrocarbon under such conditions of elevated temperature that the hydrocarbon is pyrolyzed to pyrolysis products including products in the vapor phase and carbonaceous product which form a deposit on the particulate material,
   (b) contacting a feed stream containing sulphpur dioxide with the carbonaceous product on the particulate material at elevated temperatures whereby to oxidize carbonaceous product and to reduce sulphur dioxide,
   (c) recovering a product stream containing elemental sulphur from step (b), and
   (d) sequentially repeating steps (a) to (c).

2. A method according to claim 1 in which step (a) is performed at temperatures in the range of 310° to 700° C.

3. A method according to claim 1 in which at least some of the vapor phase products of step (a) are burned, the heat thereby produced being employed to maintain the temperature of the particulate material for step (a).

4. A method according to claim 1 in which the said solid particulate material is active for promoting the reaction of step (b).

5. A method according to claim 1 in which the said solid particulate material is selected from the group consisting of bauxite, alumina, alumina and silica, alumina and chromia, and mixtures thereof.

6. A method according to claim 5 in which step (b) is performed at temperatures in the range of about 350° C. to about 1200° C.

7. A method according to claim 1 in which step (c) is performed at temperatures of about 1000° C. to about 1200° C. or higher.

8. A method according to claim 1 in which steps (a) and (b) are performed alternately in one reactor of the reactor system.

9. A method according to claim 8 in which the reactor system comprises another reactor, and when step (a) is being effected in said one reactor, step (b) is being performed in the other reactor.

10. A method according to claim 1 in which the reactor system comprises a hydrocarbon pyrolysis zone for step (a) and a sulphur dioxide reduction zone for step (b), particulate material being circulated from the pyrolysis zone to the reduction zone, and then from the reduction zone to the pyrolysis zone, the particulate material circulating co-currently with the hydrocarbon in the pyrolysis zone and co-currently with the feed stream in the reduction zone.

11. A method according to claim 10 in which the said co-current circulation of the particulate material is generally in an upwards direction.

12. A method according to claim 1 in which the amount of carbonaceous product deposited in step (a) is monitored and the supply of hydrocarbon is interrupted when the amount of carbonaceous product approaches a predetermined amount.

13. A method according to claim 1 including the additional steps of
(e) monitoring a parameter selected from the composition of the product stream of step (c) and the temperature in step (b), and
(f) interrupting the said contact of the feed stream when the monitoring of step (e) indicates that there is substantially no carbonaceous product on the particulate material.

14. A method according to claim 1 in which the heating value of the gases in vapors from step (a) is utilized to maintain the elevated temperature of said particles.

References Cited

UNITED STATES PATENTS

| | | | |
|---|---|---|---|
| 3,414,504 | 12/1968 | Oldweiler | 208—127 X |
| 2,066,896 | 1/1937 | Merriam | 423—570 |
| 3,702,816 | 11/1972 | Buchmann et al. | 208—50 |
| 2,742,410 | 4/1956 | Schutte | 208—126 |
| 2,844,521 | 7/1958 | Jahnig | 208—126 X |

FOREIGN PATENTS

| | | |
|---|---|---|
| 350,124 | 1/1931 | Great Britain. |
| 112,582 | 2/1941 | Australia. |
| 81,531 | 3/1953 | Norway. |

GEORGE O. PETERS, Primary Examiner

U.S. Cl. X.R.

423—570; 208—50, 126